(12) United States Patent  
Suzuki (10) Patent No.: US 7,844,790 B2  
(45) Date of Patent: Nov. 30, 2010

(54) SYSTEM AND METHOD FOR MANAGEMENT OF EXTERNAL STORAGE MEDIUM

(75) Inventor: Kumiko Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 11/369,999

(22) Filed: Mar. 8, 2006

(65) Prior Publication Data

US 2006/0218633 A1 Sep. 28, 2006

(30) Foreign Application Priority Data

Mar. 23, 2005 (JP) .............................. 2005-084398

(51) Int. Cl.
*G06F 12/14* (2006.01)
(52) U.S. Cl. .............................. 711/163; 711/E12.099; 726/28
(58) Field of Classification Search ........................ None
See application file for complete search history.

(56) References Cited

U.S. PATENT DOCUMENTS

| | | | |
|---|---|---|---|
| 5,572,696 A | 11/1996 | Sonobe | |
| 5,956,194 A | 9/1999 | Ohmi et al. | |
| 6,374,310 B2 | 4/2002 | Isomura | |
| 7,103,718 B2* | 9/2006 | Nickel et al. | 711/115 |
| 7,103,909 B1* | 9/2006 | Kondo et al. | 726/2 |
| 2004/0117576 A1 | 6/2004 | Kobayashi et al. | |
| 2005/0097338 A1* | 5/2005 | Lee | 713/186 |
| 2006/0236409 A1* | 10/2006 | Kuehnel et al. | 726/36 |

FOREIGN PATENT DOCUMENTS

| | | |
|---|---|---|
| EP | 0 994 439 A1 | 4/2000 |
| JP | 62-287388 | 12/1987 |
| JP | 5-151091 | 6/1993 |
| JP | 8-1393-8 | 5/1996 |
| JP | 9-282235 | 10/1997 |
| JP | 10-105663 | 4/1998 |
| JP | 10-169276 | 6/1998 |
| JP | 11-175406 | 7/1999 |
| JP | 11-249966 | 9/1999 |
| JP | 2000-123144 A | 4/2000 |
| JP | 2000-259504 | 9/2000 |
| JP | 2002-189635 | 7/2002 |
| JP | 2004-62796 | 2/2004 |

* cited by examiner

*Primary Examiner*—Matt Kim
*Assistant Examiner*—Ryan Dare
(74) *Attorney, Agent, or Firm*—Foley & Lardner LLP (57) ABSTRACT

An external storage medium management system takes into account the maintenance of data security in case an external storage medium has been taken out on emergency. It comprises an external storage medium device and an enclosure device, which is connected to a host side device and which accommodates the external storage medium device, the external storage medium device reports the result of authentication to the enclosure device in case authentication operation is done. On detection of extraction of the external storage medium device from the enclosure device, the external storage medium device of inhibits access to retained data and allows access to the data only in case the authentication in accordance with a preset system has met success. In case the enclosure device also has detected the extraction of the external storage medium device by a medium extraction detection unit, the enclosure device announces the status prevailing at the time of the extraction (authentication coincidence/non-coincidence/authentication data invalid/no authentication data) to the host side.

24 Claims, 5 Drawing Sheets

SYSTEM AND METHOD FOR MANAGEMENT OF EXTERNAL STORAGE MEDIUM

FIELD OF THE INVENTION

This invention relates to an external storage medium management system, comprised of an external storage medium device and an enclosure, capable of housing the external storage medium device therein, and to an external storage medium management method. More particularly, this invention relates to the external storage medium management system and method having the function of maintaining data security for such contingency of taking out of the external storage medium device.

BACKGROUND OF THE INVENTION

As a method for placing limitations on the takeout of an external storage medium device, such as a magnetic disc, there has so far been used a method for locking an enclosure for the external storage medium device, such as magnetic disc, with a key. For example, there is disclosed in, for example, the Japanese Patent Kokai Publication No. JP-A-10-169276 a security structure for electronic equipment comprising two keys, specifically, a key used for taking out an external storage medium device and a key used for running the external storage medium device in operation.

There has also been known a technique for placing restrictions on the accessing to data held by the external storage medium device. For example, there is disclosed in, for example, the Japanese Patent Kokai Publication No. JP-P2000-123144A a non-contact IC card having a fingerprint authenticating system for limiting data input/output.

[Patent Document 1]
Japanese Patent Kokai Publication No. JP-A-10-169276

[Patent Document 2]
Japanese Patent Kokai Publication No. JP-P2000-123144A

SUMMARY OF THE DISCLOSURE

However, the conventional scheme by locking with a key or a password suffers from a drawback that, when it is desired to move the external storage medium device to a safe place in case of an emergency, such as on outbreak of a disaster, it is not possible for a person other than a supervisor to take out the device. Of course, if keys or passwords are distributed to plural persons or to a policing firm, the problem that the external storage medium device cannot be taken out in case of an emergency would be eliminated. However, this solution cannot be said to be optimum if the occurrence of unforeseen events, such as theft of keys, or precise location of responsibilities, is taken into consideration.

The conventional scheme by locking with a key or a password has another inconvenience that the management of takeout of storage mediums is complex and the fact of taking out of the medium cannot be instantaneously captured. In view of the above problems, it is an object of the present invention to provide an external storage medium management system comprising an external storage medium device, capable of prohibiting unauthorized readout of data, and an enclosure device, capable of instantaneous detection of the fact of takeout of the external storage medium device. It is another object of the present invention to provide an external storage medium management method.

In one aspect, the present invention provides an external storage medium device that may be accommodated in an enclosure device connected to a host side device, in which the external storage medium device comprises a data holding unit retaining data, a medium management unit verifying whether or not there persist right for access, based on input authentication information, a medium extraction detection unit for detecting that the external storage medium device has been extracted from the enclosure device, and an access control unit that exercises read/write control responsive to a request from the host side device and inhibits data access, not mediated by the medium management unit, in case the external storage medium device has been extracted from the enclosure device.

In a second aspect, the present invention provides an enclosure device connected to a host side device and which may be used in combination with the aforementioned external storage medium device. The enclosure device comprises a medium extraction detection unit detecting the extraction of the external storage medium device, and a medium management unit announcing to the host side unit the fact of extraction of the external storage medium device, on detection of such extraction of the external storage medium device.

In a third aspect, the present invention provides an external storage medium management system, comprised of the aforementioned external storage medium device and the enclosure device, accommodating the external storage medium device therein, and a management method for an external storage medium device, which may be executed using the external storage medium device and the enclosure device. With this method, the external storage medium device first detects its own extraction from the enclosure device by the aforementioned storage medium extraction unit which is adapted for detecting the extraction from the enclosure device. The external storage medium device, which has detected the extraction from the enclosure device, then exercises control for subsequently inhibiting the accessing to retained data and for permitting the accessing to the retained data in case authentication in accordance with a preset system has met with success.

The meritorious effects of the present invention are summarized as follows.

According to the present invention, it becomes possible to manage an external storage medium device without locking in order to cope with a contingency instantly.

PREFERRED EMBODIMENTS OF THE INVENTION

Figure 1:
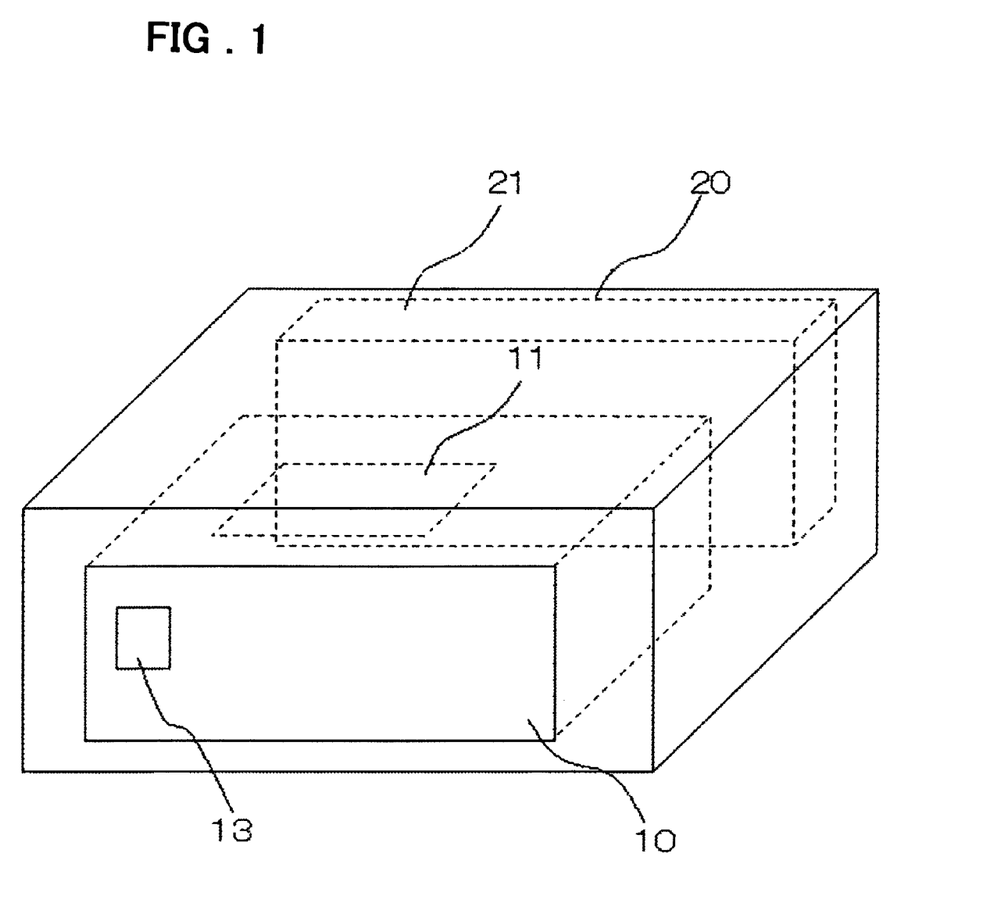
FIG. 1 is a perspective view of an external storage medium management system according to a first embodiment of the present invention.
Figure 2:
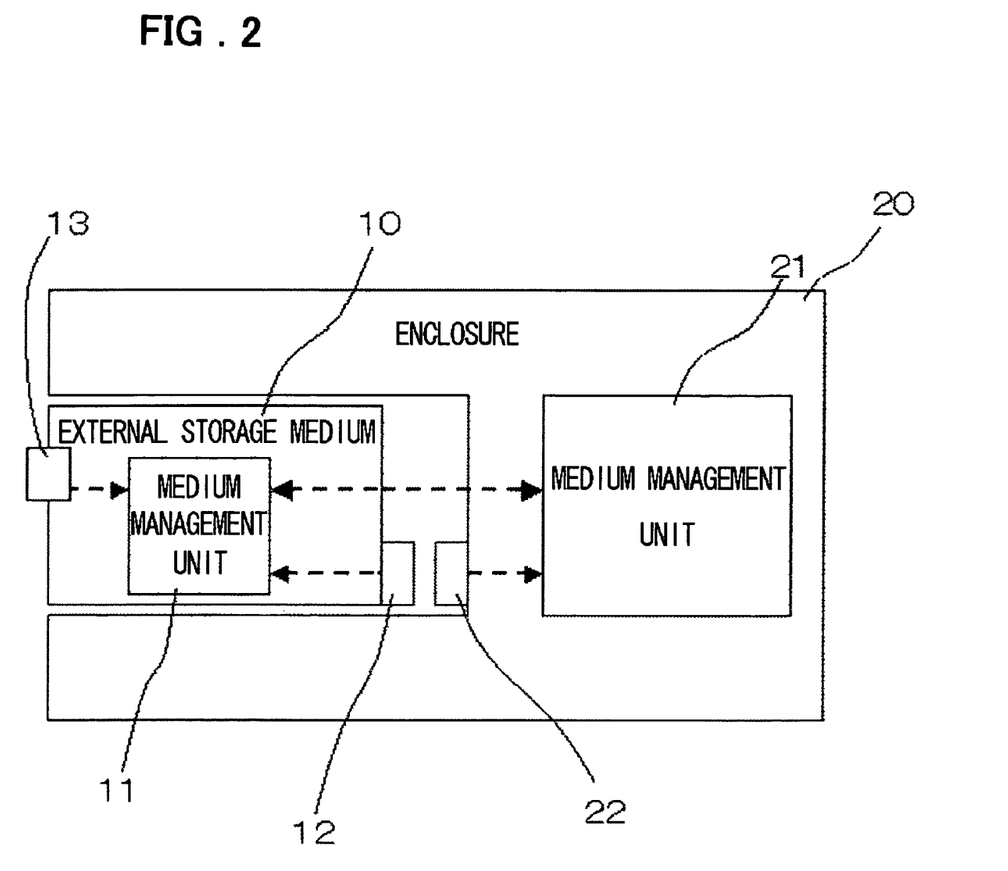
FIG. 2 shows an inner structure of the external storage medium management system according to the first embodiment of the present invention.

Referring to the drawings, the best mode for carrying out the present invention will be explained in detail. FIG. 1 depicts a perspective view of an external storage medium management system, according to a first embodiment of the present invention, and FIG. 2 shows an inner structure of the system. Referring first to FIG. 1, the external storage medium management system is made up by an external storage medium device 10, including a medium management unit 11 and a biometrics (living body) authentication unit 13, and by an enclosure device 20, including a medium management unit 21 and adapted for accommodating the external storage medium device 10 therein. Referring to FIG. 2, the external storage medium device 10 and the enclosure device 20 are provided with medium extraction detection units 12, 22, respectively, adapted for detecting the extraction of a storage medium, and are able to commence the operations, which will be explained later on, with extraction of the external storage medium device 10 from the enclosure device 20 as an incentive.

Figure 3:
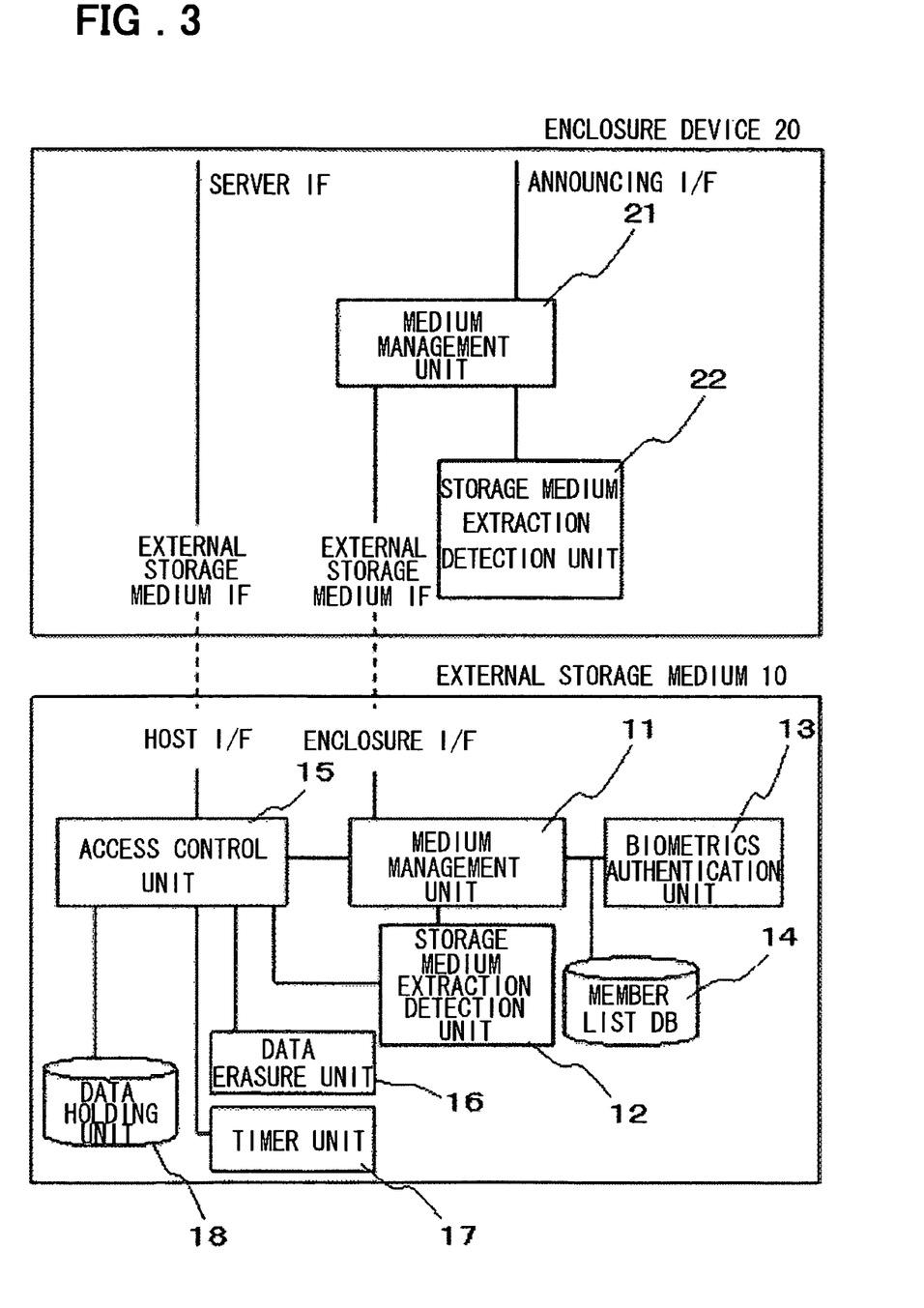
FIG. 3 is a block diagram showing a detailed structure of the external storage medium management system according to the first embodiment of the present invention.

FIG. 3 depicts a block diagram showing a detailed structure of the external storage medium management system according to a first embodiment of the present invention. The external storage medium device 10 includes the medium management unit 11, a storage medium extraction detection unit 12, the biometrics authentication unit 13, a member list database (member list DB) 14, an access control unit 15, a data erasure unit 16, a timer unit 17, and a data holding unit 18 for holding data.

The storage medium extraction detection unit 12 is e.g. a sensor for detecting the extraction from the enclosure device 20 of the external storage medium device 10. The biometrics authentication unit 13 is a means for entering the biometrics information, such as the information on the fingerprint or the iris, while the member list DB 14 is a database for registering e.g. the biometrics information of persons (members) authorized for handling the external storage medium device 10.

The medium management unit 11 matches the biometrics information, as entered from the biometrics authentication unit 13, to the information registered in the member list DB 14, to forward the result (coincidence/non-coincidence) via an enclosure I/F.

The access control unit 15 is connectable via a host I/F to e.g. the enclosure device 20, and is a means launched in response to a request from the host to exercise access control for the data holding unit 18. The access control unit 15 is also launched on detection of extraction by the storage medium extraction detection unit 12 to exercise control to inhibit access to data held by the data holding unit 18.

The data erasure unit 16 is a means for erasing data held by the data holding unit 18 in case the biometrics information has not been entered to the biometrics authentication unit 13 within a preset time as from detection of extraction by the storage medium extraction detection unit 12, or in case authentication by the biometrics information has met a failure. The timer unit 17 is a means for measuring the time duration as from detection of extraction by the storage medium extraction detection unit 12 until prosecution of the erasure operation by the data erasure unit 16.

The enclosure device 20 includes a medium management unit 21 and a medium extraction detection unit 22, in addition to including an interface for connection to e.g. a server (server I/F), an announcing I/F used for announcement, as later explained, and external storage medium I/Fs, associated with a host I/F and an enclosure I/F of the external storage medium device 10.

The medium extraction detection unit 22, similarly to the medium extraction detection unit 12 of the external storage medium device 10, is a means for detecting the extraction of the external storage medium device 10 from the enclosure device 20. The medium management unit 21 is a means for saving the results of authentication (coincidence/non-coincidence) forwarded from the medium management unit 11 of the external storage medium device 10 via external storage medium I/Fs and for announcing the results of the authentication to the host over the announcing I/F when the extraction has been detected by the medium extraction detection unit 22.

Figure 4:
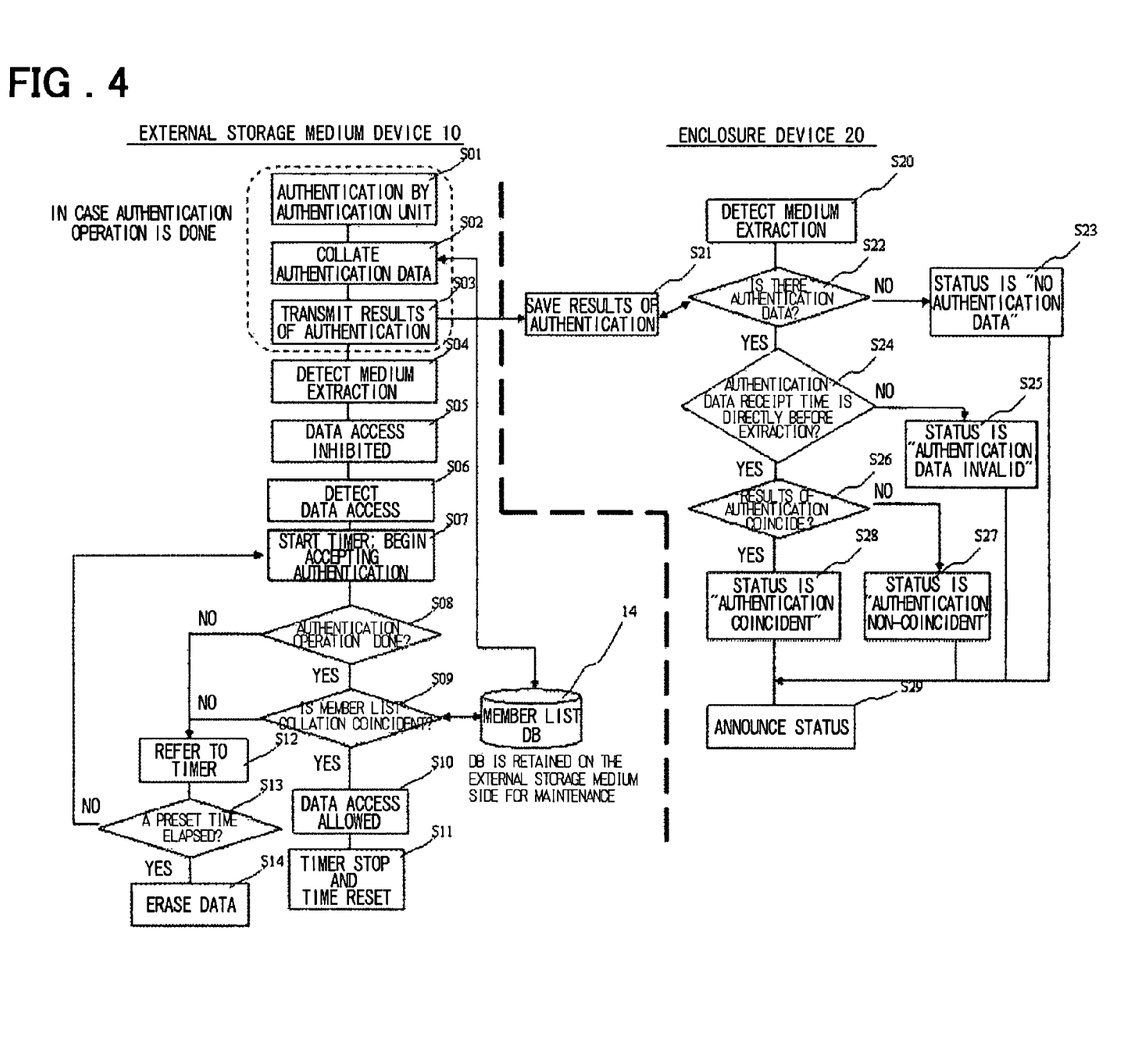
FIG. 4 is a flowchart illustrating the operation of the external storage medium management system according to the first embodiment of the present invention.

Referring to the drawings, the operation of the external storage medium management system, according to the present embodiment, will now be explained in detail. FIG. 4 depicts a flowchart for illustrating the operation of the external storage medium management system according to a first embodiment of the present invention.

The operation of the external storage medium device 10 for the case where the operation for authentication has been carried out is shown encircled in a dotted-line square indicated in an upper left side of FIG. 4. Initially, when the biometrics information is entered by the biometrics authentication unit 13 (step 01), the medium management unit 11 matches the so entered information to the information registered in the member list DB 14 (step 02) and sends the results (coincidence/non-coincidence) via enclosure I/F to the enclosure device 20 (step S03). The medium management unit 21 of the enclosure device 20 saves the results of authentication transmitted (coincidence/non-coincidence) (step S21).

Also, on detection of extraction by the storage medium extraction detection unit 12, the external storage medium device 10 initiates the following processing (step S04 ff.), without dependency upon whether or not the above authentication processing has been carried out. Initially, the access control unit 15 disables data accessing to the data holding unit 18 (step S05).

If a data access request is made as from this state (step S06), the access control unit 15 launches the biometrics authentication unit 13 and the timer unit 17 to start measuring the length of time elapsed (step S07).

If the biometrics information has been entered to the biometrics authentication unit 13 before the time measured by the timer unit 17 has reached the preset time duration (YES of step S08), and the information so entered is coincident with the contents of the member list DB 14 (YES of step S09), the access control unit 15 allows the accessing to data (step S10) and halts the timer, while resetting the timer time (step S11).

If the time as measured by the timer unit 17 has reached a preset time as the biometrics information is not entered to the biometrics authentication unit 13 (NO of step S08) or as the biometrics information as entered is not coincident with the contents of the member list DB 14 (NO of step S09) (steps S12 and S13), the access control unit 15 launches the data erasure unit 16 to erase data held by the data holding unit 18 (step S14).

On the other hand, if the medium extraction detection unit 22 detects the extraction of the external storage medium device 10 by the medium extraction detection unit 22, as indicated on the right-hand side of FIG. 4, the enclosure device 20 commences the following processing (step S20). Initially, the medium management unit 21 verifies whether or not the results of authentication (coincidence/non-coincidence) transmitted from the external storage medium device 10 have been saved (step S22). If no results of authentication (coincidence/non-coincidence) have been saved, the medium management unit 21 generates the extraction status information of 'no authentication data' to announce it to the host side (steps S23 and S29).

If conversely the results of authentication (coincidence/non-coincidence) have been saved, it is verified whether or not the timing of reception of the results of authentication (coincidence/non-coincidence) is immediately before the time of extraction (step S24). If the time of reception is not comprised within a preset time duration indicating that the time of reception of the results of authentication (coincidence/non-coincidence) is directly previous to the time of extraction, the medium management unit 21 generates the extraction status information for 'authentication data invalid' to announce it to the host side (steps S25 and S29).

If the time of reception of the results of authentication (coincidence/non-coincidence) is comprised within the preset time duration indicating that the time of reception of the results of authentication (coincidence/non-coincidence) is immediately previous to the time of extraction, the medium management unit 21 generates the extraction status information for 'authentication coincident' or 'authentication non-coincident', corresponding to the coincidence or non-coincidence of the results of authentication, respectively, to announce it to the host side (steps S26 to S29).

In the present embodiment, described above, the fact of takeout of the external storage medium device 10 and whether or not the authentication at the time of the takeout has been done correctly may be automatically announced to the host side, so that the takeout of the external storage medium device 10 may be comprehended reliably. Hence, by having the present external storage medium management system cooperate with, for example, a security gate system of a machine room, it becomes possible to close a gate of the machine room to inhibit the takeout per se of the external storage medium.

In addition, in case the external storage medium device 10 is taken out by a person other than those authorized to handle the device, access to the data held in the storage medium is inhibited, as a principle, so that maintenance of data security becomes possible. In particular, since the data retained is erased in case the biometrics information has not been entered correctly, the risk of theft of data retained may appreciably be reduced even in case of burglary of the external storage medium device 10.

Figure 5:
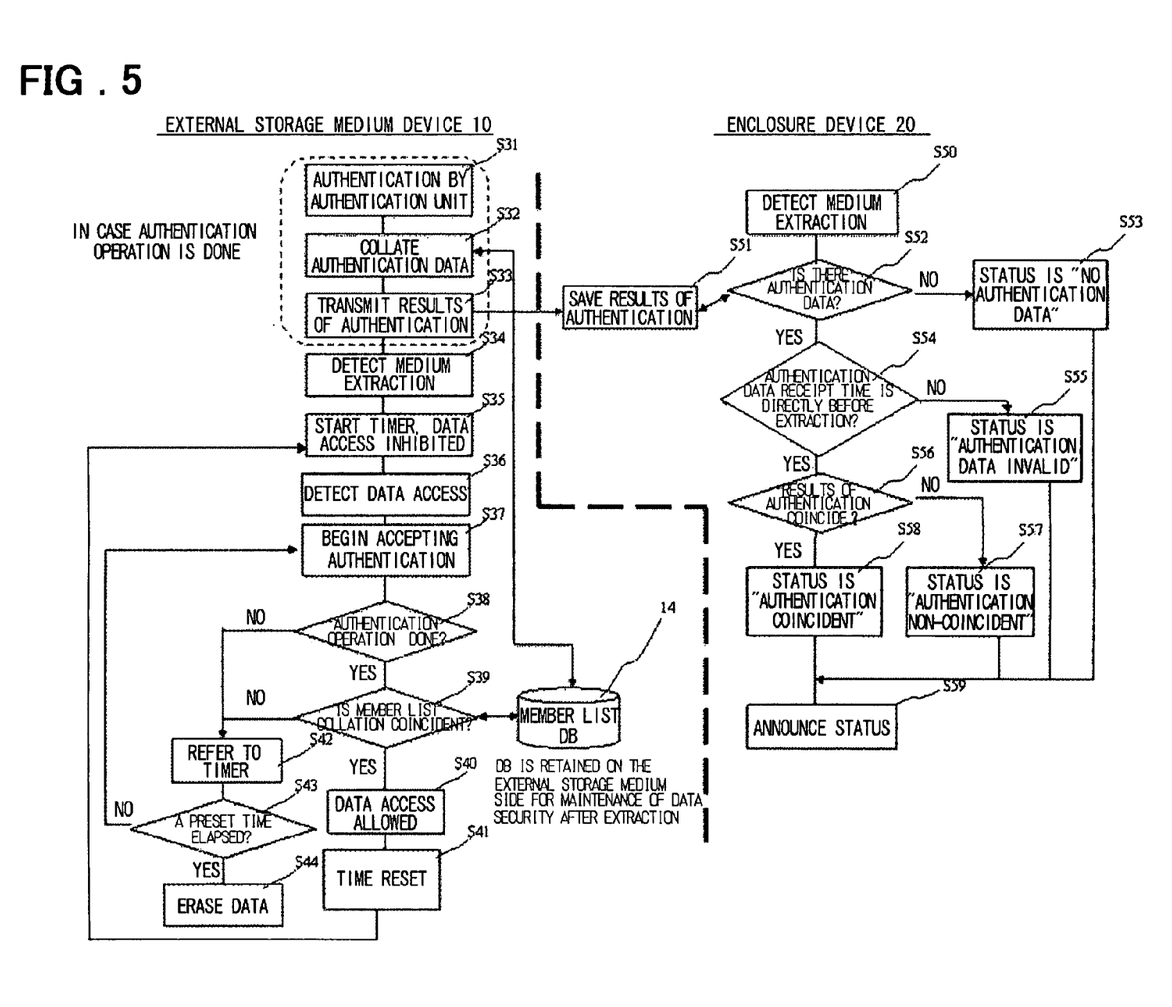
FIG. 5 is a flowchart illustrating the operation of an external storage medium management system according to a second embodiment of the present invention.

A second embodiment of the present invention, which may be implemented by a structure similar to the above-described first embodiment, will now be explained. The common portions of the structure and the operation of the external storage medium device are not explained and only the portions differing from the first embodiment are explained in detail. FIG. 5 is a flowchart showing the operation of the external storage medium management system according to the second embodiment of the present invention. As indicated on the left-hand side of FIG. 5, when the extraction of the external storage medium device 10 is detected by the medium extraction detection unit 12 (step S34), the access control unit 15 launches the timer unit 17, while disabling data accessing to the data holding unit 18, without dependency upon whether or not the operation for authentication has been carried out (step S35).

If a data access request is made as from this state (step S36), the access control unit 15 launches the biometrics authentication unit 13 (step S37). If now the biometrics information is entered to the biometrics authentication unit 13 (YES of step S38), and the information thus entered coincides with the contents of the member list DB 14 (YES of step S39), the access control unit 15 allows having access to data (step S40). The timer time is then reset (step S41), after which processing reverts to the step S35 to re-initiate the timer operation.

In case the time duration as measured by the timer unit 17 has reached a preset value as no biometrics information is entered to the biometrics authentication unit 13 (NO of step S38), or as the biometrics information entered is not coincident with the contents of the member list DB 14 (NO of step S39) (steps S42 and S43), the access control unit 15 launches the data erasure unit 16 to erase data held by the data holding unit 18 (step S44).

Meanwhile, the operation on the side of the enclosure device 20 is similar to that of the first embodiment of the present invention described above. In the present embodiment, in distinction from the first embodiment, described above, data is compulsorily erased unless a person authorized to handle the external storage medium device 10 performs an unlock operation, that is, cancels the data access inhibit control, within a preset time duration after taking out the external storage medium device 10 from e.g. the machine room. This assures maintenance of data security from a different perspective. Moreover, since the timer unit is again in operation even after the lock (data access inhibition control) is once canceled, data retained may be maintained even in case a person authorized to handle the external storage medium device 10 has lost the external storage medium device after cancellation of the data access inhibit control.

Although the preferred embodiments of the present invention have been explained in the foregoing, the technical scope of the present invention is not limited to the embodiments described and a variety of changes or substitutions by equivalents may be made without departing from the scope of the present invention which consists in employing an external storage medium device, adapted for inhibiting data accessing as a principle with the extraction from the enclosure device as an incentive and for allowing data accessing only when the rights to have access are recognized based on the authentication information, and an enclosure device operatively associated with the external storage medium device. For example, although the above-described embodiments use the biometrics authentication unit 13 in order to effect authentication using the biometrics information, the similar operation and meritorious effects may, of course, be achieved with use of other types of the authentication information.

In the above-described embodiments, the extraction status information is generated on the side of the enclosure device and transmitted to the host side. It is also possible for the enclosure device to directly transmit the results of authentication (coincidence/non-coincidence) to the host side, which host side then proceeds to verify the situation (status) of extraction of the external storage medium device 10.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An external storage medium device that may be accommodated in an enclosure device connected to a host side device, said external storage medium device comprising:
   a data holding unit holding data;
   a first medium management unit verifying whether or not a right for access to said data holding unit has been made, based on input authentication information;
   a first medium extraction detection unit detecting that the external storage medium device has been extracted from said enclosure device;
   an access control unit that exercises read/write control for said data holding unit responsive to a request from said host side device and inhibits data access when said first medium management unit has not received the right for access, after extraction of said data holding unit from said enclosure device, the inhibiting of data access being done before said access control unit erases data held by said data holding unit;

a second medium extraction detection unit detecting extraction of the external storage medium device; and a second medium management unit announcing the fact of extraction of the external storage medium device to a predetermined host side device when the extraction of the external storage medium device has been detected by the second medium extraction detection unit, wherein the predetermined host side device performs additional security operations to physically inhibit data access to said data holding unit based on notification of the fact of extraction of the external storage medium device.

2. The external storage medium device according to claim 1 wherein said access control unit runs a timer into operation, starting at a time point when data access is made after extraction of the external storage medium device from said enclosure device, and erases data held by said data holding unit after lapse of a predetermined time has been counted by the timer that corresponds to a time period when the right for access has not been received and authenticated.

3. The external storage medium device according to claim 1 wherein said access control unit runs a timer into operation, upon extraction from said enclosure device, and erases data held by said data holding unit after lapse of a predetermined period of time when the right for access has not been received and authenticated.

4. The external storage medium device according to claim 3 wherein said access control unit initializes said timer and runs the timer into operation again if, after extraction of the external storage medium device from said enclosure device, said first medium management unit has verified that the right for access has been made and has been authenticated.

5. The external storage medium device according to claim 1 wherein said first medium management unit sends a result of verification of the right for access, which is based on said authentication information, to said enclosure device.

6. An enclosure device that may be accommodated in the external storage medium device according to claim 5, wherein said second medium management unit announces the fact of extraction of the external storage medium device, along with the presence/absence of said right for access, to said predetermined host side device when the extraction of the external storage medium device has been detected.

7. An enclosure device that may accommodate the external storage medium device according to claim 5, wherein said second medium management unit announces the extraction status information dependent on whether or not there persist the right for access to said predetermined host side device when the extraction of the external storage medium device has been detected.

8. The external storage medium device according to claim 1 wherein said authentication information is biometrics authentication information.

9. An enclosure device that may be accommodated in the external storage medium device according to claim 8, wherein said second medium management unit announces the fact of extraction of the external storage medium device, along with the presence/absence of said right for access, to said predetermined host side device when the extraction of the external storage medium device has been detected.

10. An enclosure device that may accommodate the external storage medium device according to claim 8, wherein said second medium management unit announces the extraction status information dependent on whether or not there persist the right for access to said predetermined host side device when the extraction of the external storage medium device has been detected.

11. A management method for an external storage medium device employing said external storage medium device and an enclosure device connected to a host side device and accommodating therein said external storage medium device, said method comprising:

a step of detecting extraction from said enclosure device of said external storage medium device, by a medium extraction detection unit which detects said extraction from said enclosure device;

a step of said external storage medium device, having detected extraction thereof from said enclosure device, subsequently inhibiting access to data stored within a data holding unit of said external storage medium device until the time of success in authentication in accordance with a preset authentication system, the inhibiting of access to data being done before said access control unit erases data held by said data holding unit;

a step of determining that data access has been made after said external storage medium device has been detected to have been extracted from said enclosure device;

a step of, after lapse of a predetermined period of time after data access has been determined to have been made after extraction of said external storage medium device from said enclosure device, sending a signal to a security gate system of a room in which said external storage medium and said host side device are each disposed;

a step of receiving said signal by said security gate system; and a step of, when a right for access to said external storage medium device has not been received and authenticated within the predetermined period of time and upon receipt of said signal by said security gate system, closing a gate of the room to prevent a person from exiting the room.

12. The management method for an external storage medium management device according to claim 11 further comprising the steps of:

said external storage medium device detecting that data access has been made after extraction thereof from said enclosure device; and said external storage medium device erasing data held by said data holding unit in case authentication in accordance with a predetermined system is not made before lapse of a preset period of time as from the time of said data access.

13. The management method for an external storage medium management device according to claim 11 further comprising the step of:

said external storage medium device having detected extraction thereof from said enclosure device erasing data held by said data holding unit in case authentication has not been made in accordance with a preset system before a preset period of time elapses as from the time when said data access has been made.

14. The management method for an external storage medium device according to claim 13 wherein said external storage medium device which has detected extraction thereof from said enclosure device erases data held by said data holding unit even in case an authentication operation is done in accordance with a preset system before lapse of a preset period of time as from the time said data access is made but the authentication has not met with success in accordance with the preset system before the lapse of the preset period of time as from the time said data access is made.

15. The management method for an external storage medium device according to claim 11 further comprising the steps of:
said enclosure device detecting extraction of said external storage medium device by a medium extraction detection unit detecting the extraction of said external storage medium device; and
said enclosure device having detected extraction of said medium extraction detection unit announcing the fact of the extraction of said external storage medium device to a preset host device.

16. The management method for an external storage medium management device according to claim 11 further comprising the steps of:
said external storage medium device transmitting a result of authentication to said enclosure device; and
said enclosure device transmitting the result of authentication to said preset host device.

17. The management method for an external storage medium device according to claim 16 wherein
said enclosure device generates and transmits the extraction status information dependent on the result of authentication in place of transmitting said result of authentication.

18. An external storage medium management system comprising an external storage medium device that may be accommodated in an enclosure device connected to a host side device, said external storage medium device comprising:
a data holding unit holding data;
a medium management unit verifying whether or not a right for access to said data holding unit has been made, based on input authentication information;
a medium extraction detection unit detecting that the external storage medium device has been extracted from said enclosure device; and
an access control unit that exercises read/write control for said data holding unit responsive to a request from said host side device and inhibits data access when said medium management unit has not received the right for access, after extraction of said data holding unit from said enclosure device, the inhibiting of data access being done before said access control unit erases data held by said data holding unit; and
an enclosure device that may be accommodated in the external storage medium device, said enclosure device comprising:
a medium extraction detection unit detecting extraction of the external storage medium device; and
a medium management unit announcing the fact of extraction of the external storage medium device to a predetermined host side device when the extraction of the external storage medium device has been detected,
wherein said access control unit runs a timer into operation, with data access made after extraction of the external storage medium device from said enclosure device, and said access control unit sends a signal to a security gate system of a room in which said external storage medium and said host side device are each disposed, in order to close a gate of the room to prevent a person from exiting the room, after lapse of a predetermined time when the right for access has not been received and authenticated.

19. An external storage medium device that may be accommodated in an enclosure device connected to a host side device, said external storage medium device comprising:
a data holding unit holding data;
a medium management unit verifying whether or not a right for access to said data holding unit has been made, based on input authentication information;
a medium extraction detection unit detecting that the external storage medium device has been extracted from said enclosure device; and
an access control unit that exercises read/write control for said data holding unit responsive to a request from said host side device and inhibits data access when said first medium management unit has not received the right for access, after extraction of said data holding unit from said enclosure device, the inhibiting of data access being done before said access control unit erases data held by said data holding unit,
wherein said access control unit runs a timer into operation, with data access made after extraction of the external storage medium device from said enclosure device, and said access control unit sends a signal to a security gate system of a room in which said external storage medium and said host side device are each disposed, in order to close a gate of the room to prevent a person from exiting the room, after lapse of a predetermined time when the right for access has not been received and authenticated.

20. The external storage medium device according to claim 19 wherein said access control unit runs a timer into operation, starting at a time point when data access is made after extraction of the external storage medium device from said enclosure device, and erases data held by said data holding unit after lapse of a predetermined time has been counted by the timer that corresponds to a time period when the right for access has not been received and authenticated.

21. The external storage medium device according to claim 19 wherein said access control unit runs a timer into operation, upon extraction from said enclosure device, and erases data held by said data holding unit after lapse of a predetermined period of time when the right for access has not been received and authenticated.

22. The external storage medium device according to claim 21 wherein said access control unit initializes said timer and runs the timer into operation again if, after extraction of the external storage medium device from said enclosure device, said medium management unit has verified that the right for access has been made and has been authenticated.

23. The external storage medium device according to claim 19 wherein said medium management unit sends a result of verification of the right for access, which is based on said authentication information, to said enclosure device.

24. The external storage medium device according to claim 19 wherein said authentication information is biometrics authentication information.

* * * * *